US006741708B1

(12) United States Patent
Nakatsugawa

(10) Patent No.: US 6,741,708 B1
(45) Date of Patent: May 25, 2004

(54) ACOUSTIC SYSTEM COMPRISED OF COMPONENTS CONNECTED BY WIRELESS

(75) Inventor: Yoshinori Nakatsugawa, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 600 days.

(21) Appl. No.: 09/697,646

(22) Filed: Oct. 27, 2000

(30) Foreign Application Priority Data

Oct. 29, 1999 (JP) .................................... P 11-309611

(51) Int. Cl.[7] .............................................. H04B 5/00
(52) U.S. Cl. ...................................... 381/79; 381/77
(58) Field of Search .................... 381/79, 77; 370/328; 375/141, 244

(56) References Cited

U.S. PATENT DOCUMENTS 6,466,832 B1 * 10/2002 Zuqert et al. ............... 370/328

FOREIGN PATENT DOCUMENTS

JP 407075200 A * 3/1995 ............. H04S/1/00
JP 7-288512 10/1995

OTHER PUBLICATIONS

Schotz et al. ; Digital wireless speaker system; Aug. 14, 1997; WO 97/29550.*

* cited by examiner

*Primary Examiner*—Melur Ramakrishnaiah
(74) *Attorney, Agent, or Firm*—Finnegan, Henderson, Farabow, Garrett, & Dunner, L.L.P.

(57) ABSTRACT

According to this invention, instead of a conventionally used wire, a radio transmitting medium is employed as a transmitting medium for transmitting information containing sound signal between a sound input unit for inputting the sound signal generated in a sound generating source and at least one sound output unit.

5 Claims, 3 Drawing Sheets

ACOUSTIC SYSTEM COMPRISED OF COMPONENTS CONNECTED BY WIRELESS

BACKGROUND OF THE INVENTION

1. Field of the Invention

The present invention relates to an acoustic system provided in an acoustic space of, for example, home, vehicle compartment, movie theater, stage, concert hall or the like, the acoustic system comprising a sound input unit for inputting sound signals generated by a sound generator and at least a sound output unit, and more particularly to an acoustic system capable of contributing to improvement of appearance thereof and improvement of working efficiency and freedom of installation of its respective component units.

2. Description of the Related Art

Conventionally, for example, an acoustic system disclosed in Japanese Patent Application Laid-Open No. H7-288512 has been known as the acoustic system for use in acoustic space of, for example, home and vehicle compartment.

The acoustic system disclosed in the same publication comprises a wireless microphone transmitter which is a sound generator, a receiver for receiving a sound signal sent from the transmitter, an amplifier for amplifying a sound signal received by the same receiver at a determined amplification factor and a pair of speakers which are connected to the same amplifier through wire and convert a sound signal amplified by the amplifier to aerial vibration so as to produce sounds.

In such a system, the wireless microphone transmitter sends a sound signal picked up thereby to the receiver by radio and then, the amplifier amplifies the received sound signal. The amplified sound signal is sent to a pair of the speakers through wire and each of the speakers outputs a sound. Therefore, a person holding a wireless microphone transmitter can secure freedom of activity without being annoyed by handling the wire of a microphone.

However, because in the aforementioned conventional acoustic system, the wire still exists between the amplifier and a pair of the speakers, the wire needs to be placed around between the respective units to construct an acoustic system. Consequently, the wires placed around in this way damages the appearance of the acoustic system and the working efficiency and freedom of installation of the respective units. Therefore, there has been a problem to be solved in this point.

SUMMARY OF THE INVENTION

The present invention has been achieved to solve the above problem and therefore an object of the invention is to provide an acoustic system employing a radio transmitting medium as a transmitting medium for transmitting information containing sound signal between a sound input unit for inputting a sound signal generated in a sound generating source and at least a sound output unit instead of a conventionally used wire, thereby contributing to improvement of appearance and improvement of working efficiency and freedom of installation of respective related units.

To achieve the above object, according to an aspect of the present invention, there is provided an acoustic system comprising a sound input unit for inputting a sound signal generated in a sound generating source and at least one sound output unit for outputting sound based on the sound signal, wherein radio transmitting medium is employed as a transmitting medium for transmitting information containing the sound signal between the sound input unit and the at least one sound output unit.

The reason why a transmission object of the present invention is expressed as information including sound signal is that the transmission object includes not only the sound signal but also various control signals for command, control and the like and further, information concerning correction of a difference of time, which will be described later.

In the acoustic system of the present invention, a radio transmitting medium is employed as a transmitting medium for transmitting information containing sound signal between, for a sound input unit such as an amplifier and at least one sound output unit such as a speaker, instead of a conventionally used wire. As a result a necessity of placing wire around between respective units when establishing the acoustic system is eliminated, thereby contributing to improvement of appearance and improvement of working efficiency and freedom of installation of respective related units.

Here, an example of operation and effect which the present invention can exert will be described. That is, as a result of analysis of the frequency characteristic of man's sense of hearing, it has been generally known that man's sense of hearing has a directivity in middle and treble ranges while it has no directivity in bass range. This indicates that if an excellent sound field is intended to be formed, a squawker and a tweeter in charge of sound output in the middle and treble ranges are desired to be disposed to directly oppose the ears of a listener, while such a consideration is not necessary for a woofer in charge of sound output in bass range. When multiple speakers in charge of each sound range are disposed at each appropriate positions based on such a knowledge, the acoustic system of the present invention having a high working efficiency and freedom of installation of respective related units is expected to exert a very excellent effect.

In the meantime, in the acoustic system of the present invention, directivity of information transmitted between the respective units through radio transmitting medium is not restricted to any particular one. That is, for example, information containing sound signal may be transmitted in a single direction from the sound input unit to the at least one sound output unit or bidirectionally between the respective units.

According to a preferred embodiment of the present invention, part or all of the information is transmitted bidirectionally between the sound input unit and the at least one sound output unit.

According to this embodiment, part or all of the information containing sound signal is transmitted bidirectionally between the sound input unit and the at least one sound output unit. As a result, the information can be transmitted using a transmission style appropriate for the type of information to be transmitted. That is, for example, if the transmission object is only sound signal, one-direction transmission style is used, while if the transmission object includes not only the sound signal but also various control signal for command, control and the like and information concerning correction of a difference of time which will be described later, bidirectional transmission style is employed.

Major features and scope of application of the present invention have been described above. Disclosure of preferred embodiments of the present invention may be meaningful for clarifying an extension of the scope thereof.

In this viewpoint, according to a preferred embodiment of the present invention, the sound input unit comprises at least: an input interface for inputting a sound signal generated in the sound generating source; an encoder for digitizing the inputted sound signal; and a transmitting means for modulating the digitized sound signal and sending through the radio transmitting medium, and each sound output unit comprises at least: a receiving means for receiving a sound signal sent through the radio transmitting medium and demodulating the received sound signal; a decoder for decoding the demodulated sound signal; and an output interface for outputting a sound signal restored by the decoding.

According to this embodiment, first of all, a sound signal generated in a sound generating source is inputted into the sound input unit through the input interface. Then, the encoder digitizes the inputted sound signal and then, the transmitting means modulates the digitized sound signal and send it through the radio transmitting medium. On the other hand, in each sound output unit, a reception means thereof receives sound signal sent through the radio transmitting medium and demodulates the received sound signal. Then, the decoder decodes the demodulated sound signal. Consequently, a sound signal restored by the decoding is outputted through the output interface. By receiving the sound signal outputted through the output interface, the acoustic unit such as a speaker outputs sound.

As a result, this embodiment contributes not only to improvement of appearance but also improvement of working efficiency and freedom of installation of respective related units. Additionally, because the digital transmission method is employed, an acoustic system appropriate for such recent technological trend as prevalence of digital units can be realized.

If imagining a sound space to which the acoustic system of the present invention is applied, for example, home, vehicle compartment, move theater, stage, concert hall and the like can be exemplified. If the acoustic system of the present invention is applied to a relatively wide sound space and multiple sound output units are employed, a difference of time in arrival of sound signal between the respective sound output units becomes so large that it cannot be neglected, so that there may be generated such an event that makes listeners feel a sense of disharmony.

Thus, according to a preferred embodiment of the present invention, if multiple sound output units exist and a difference of time occurs between such multiple sound output units, this difference of time is corrected.

Because according to this embodiment, if multiple sound output units exist and there is generated a difference of time of the sound signal between the multiple sound output units, the difference of time is corrected, even if the difference of time between the respective sound output units becomes so large that it cannot be neglected, it is possible to avoid such an event that makes listeners feel a sense of disharmony.

Although the countermeasure for a difference of time generated between the multiple sound output units has been described above, various approaches for this correction of the difference of time can be considered.

As an example of various approaches, according to a preferred embodiment of the present invention, the information includes a block synchronous signal and a left/right synchronous signal and the difference of time is corrected based on both the synchronous signals.

According to this embodiment, the correction of the difference of time is carried out based on both the block synchronous signal and the left/right synchronous signal. Therefore, each of the multiple sound output units can cancel a difference of time and a difference of phase by only outputting sound synchronously with both the synchronous signals. Consequently, the difference of time can be corrected with such a simple method.

Further, according to a preferred embodiment of the present invention, correction of the difference of time is carried out based on a difference of time of the sound signal actually measured between the multiple sound output units.

Because according to this embodiment, the correction of the difference of time is carried out based on a difference of time actually measured of the sound signal between the multiple sound output units, a highly accurate correction of the difference of time can be carried out depending on an actual situation.

In the above described acoustic system, for example, if the transmission object is only sound signal, one-direction transmission style is used, while if the transmission object includes not only the sound signal but also various control signal for command, control and the like and information concerning correction of a difference of time, which will be described later, bidirectional transmission style is employed so that the information can be transmitted using a transmission style appropriate for the type of information to be transmitted. However, to transmit information including the sound signal between the sound input unit and the at least one sound output unit, it is important to prepare a system capable of identifying each unit.

Then, according to a preferred embodiment of the present invention, each of the sound input unit and the at least one sound output unit is provided with an address capable of identifying each unit.

According to this embodiment, such a system for specifying an address is arranged to enable respective units to identify each other. Therefore, when transmitting information between the sound input unit and the at least one sound output unit, if the transmitter is so constructed to specify addresses of a destination and the transmitter, the transmitter is capable of transmitting information by specifying a particular destination. Further, the receiver is capable of knowing from which transmitter information is received. Further, if speaking an example of application of such address specifying method, for example, assume that a sound signal is inputted to the sound input unit from multiple independent sound generating sources such as monophonic terminal, KARAOKE system, telephone or the like and then it is desired to distribute and output that sound signal to multiple sound output units. Then, by providing each of the multiple independent sound generating sources with an address capable of identifying each unit such that the sound generating source and sound output unit are connected to each other by specifying their addresses, multiple sound systems can be established. As a result, the aforementioned desired can be satisfied.

Here, the concept of "providing at least one sound output unit with an address capable of identifying itself" includes not only a case in which an address is given to each sound output unit but also is a concept including so-called group address in which an address is given to entirely multiple sound output units. If such group address concept is used, if sound volume, sound field balance or the like is desired to be set on the sound output unit according to an instruction from the sound input unit, not only various settings can be instructed to each particular unit, but also the various setting can be carried out in each sound output group at the same time so that each sound control unit belonging to the group is set to the same condition, by sending various setting signals to each sound output group such as right/left or front/rear.

Meanwhile, assuming that for example, four sound output units correspond to front left speaker, front right speaker, rear left speaker and rear right speaker, the “address” used here is such a concept including a case in which the destination is specified by directly specifying individual locations such as front left. If such a concept is employed, the destination can be specified more easily corresponding to human sensitivity as compared to a case in which a determined address is specified from bit-column address allocated to each sound output unit.

Further, according to a preferred embodiment of the present invention, the at least one sound output unit actively changes a sound output function according to a command instruction sent from the sound input unit.

Because according to this embodiment, the at least one sound output unit actively changes its sound output function according to a command instruction sent from the sound input unit, for example if a command instruction for changing over the sound output function of the sound output unit dynamically is sent, the sound field can be changed dynamically at real time. Consequently, diversified applications of this effect can be expected, so that, for example, a novel acoustic effect can be produced in TV game, movie theater and the like.

The nature, principle and utility of the invention will become more apparent from the following detailed description when read in conjunction with the accompanying drawings.

DESCRIPTION OF THE PREFERRED EMBODIMENTS

Hereinafter, the preferred embodiments of the acoustic system according to the present invention will be described in detail with reference to the accompanying drawings.

According to the present invention, instead of the conventionally used wire as a transmission medium for transmitting sound signal between respective input and output units such as a sound input unit for inputting a sound signal generated in a sound generator, for example, an amplifier and at least, a sound output unit incorporating an acoustic unit, for example, like a speaker, radio transmitting medium is employed to aim at improvement of the appearance and improvement of the working efficiency and freedom of installation of respective related units.

Figure 1:
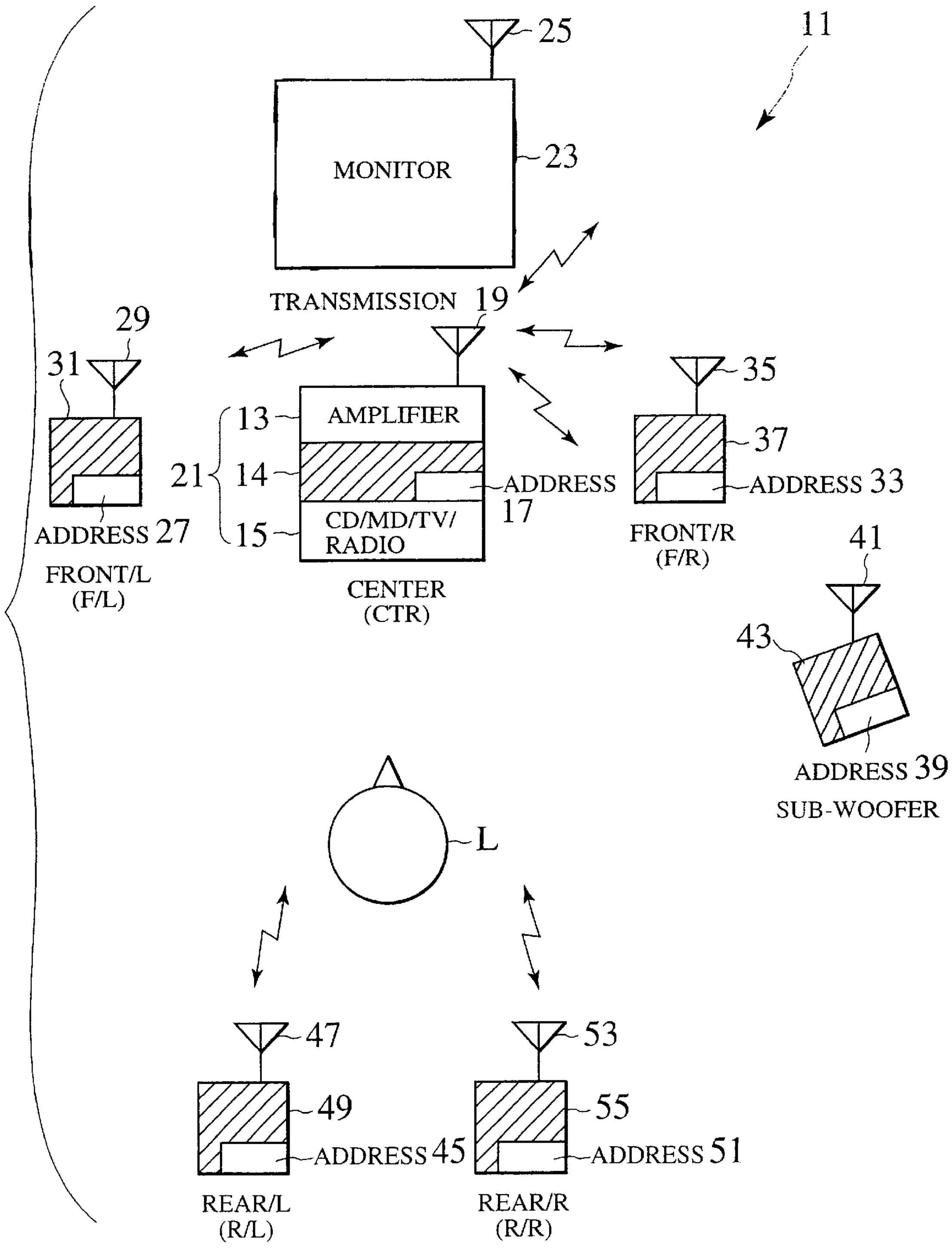
FIG. 1 is a schematic block diagram of an acoustic system according to the present invention.

To achieve such an initial purpose, the acoustic system of the present invention employs a structure shown in FIG. 1. That is, the acoustic system 11 installed in an acoustic space comprises a sound input unit 21 containing a first sound output unit 14, an image output unit 23 to which an antenna is connected, a second sound output unit disposed to the front left with respect to a listener L located near the center of the acoustic space in FIG. 1, a third sound output unit 37 disposed at the front right, a fourth sound output unit 43 disposed to the right with respect to the listener, a fifth sound output unit 49 disposed to the rear left and a sixth sound output unit 55 disposed to the rear right.

Each of the second to sixth sound output units except the fourth sound output unit 43 contains a tweeter in charge of treble range, a squawker in charge of midrange, a woofer in charge of bass range and the like. The fourth sound output unit 43 contains a sub-woofer speaker in charge of bass range to supplement the bass range of sounds produced from the above mentioned respective sound output units. However, the second to sixth sound output units except the fourth sound output unit 43 do not have to contain all the speakers including tweeter, squawker and woofer, however may contain appropriate speakers in charge of sound range depending on each application selectively. Further, each of the second to sixth sound output units except the fourth sound output unit 43 may be set up so that its sound ranges are switched over manually depending on the purpose of each application or may be so constructed that the sound ranges are changed actively according to a command instruction sent from the sound input unit 21. In this way, for example, if a command instruction for switching the sound output function possessed by the sound output unit dynamically is sent from the sound input unit, sound field can be changed dynamically at real time. As a result, a novel acoustic effect can be produced in TV game, movie theater and the like and diversified application of this effect can be expected.

The sound input unit 21 comprises an audio amplifier 13 for amplifying an inputted sound signal, sound generator group 15 including CD unit, MD unit, TV unit, radio receiver, microphone and the like and an antenna 19. The second sound output unit 31 has an antenna 29. The third sound output unit 37 has an antenna 35. The fourth sound output unit 43 has an antenna 41. The fifth sound output unit 49 has an antenna 47. The sixth sound output unit 55 has an antenna 53.

To transmit information by specifying a destination and a transmitter between the above mentioned respective input/output units, particular addresses 17, 27, 33, 39, 45, 51 capable of recognizing each unit are given to the sound input unit 21 and the first to sixth sound output units 14, 31, 37, 43, 49, 55. Then, when transmitting information between the input unit and the output unit, the transmitter specifies addresses of a destination and the transmitter. As a result, the transmitter is capable of transmitting information to a specified destination. Further, the receiver is capable of recognizing information from which transmitter. An example of application of such address specifying method will be described. For example, if sound signals are inputted to the sound input unit from multiple independent sound generators such as monophonic terminal unit, KARAOKE system, telephone unit and the like and these sound signals are requested to be distributed to multiple sound output units and outputted therefrom at the same time, by providing the multiple independent sound generators with mutually recognizable addresses so that each sound generator coincides with each sound output unit one to one through their addresses, multiple sound systems can be established at the same time. Thus, such a demand can be satisfied.

Further, by sending a sound volume setting signal to each particular destination, a sound volume of each sound output unit can be set and by sending a sound field setting signal to each particular destination, sound field balance about right/left or front/rear, live performance, sound range and the like can be set up. To set a sound volume in each sound output unit, an amplification factor is set up in an amplifier 72 which will be described later by referring to a sound volume setting signal sent to a given sound output unit. Further, to set up a sound field balance or the like in each sound output unit, a delay time in sound phase level is adjusted in a delay portion 97 by referring to a sound field setting signal sent to a given unit. The setting of the aforementioned sound volume, sound field balance and the like is carried out not only for each particular destination, but also by sending various setting signals to sound output group, for example, right/left or front/rear, various setting for each sound output unit belong to each sound output group can be carried out.

Figure 2A:
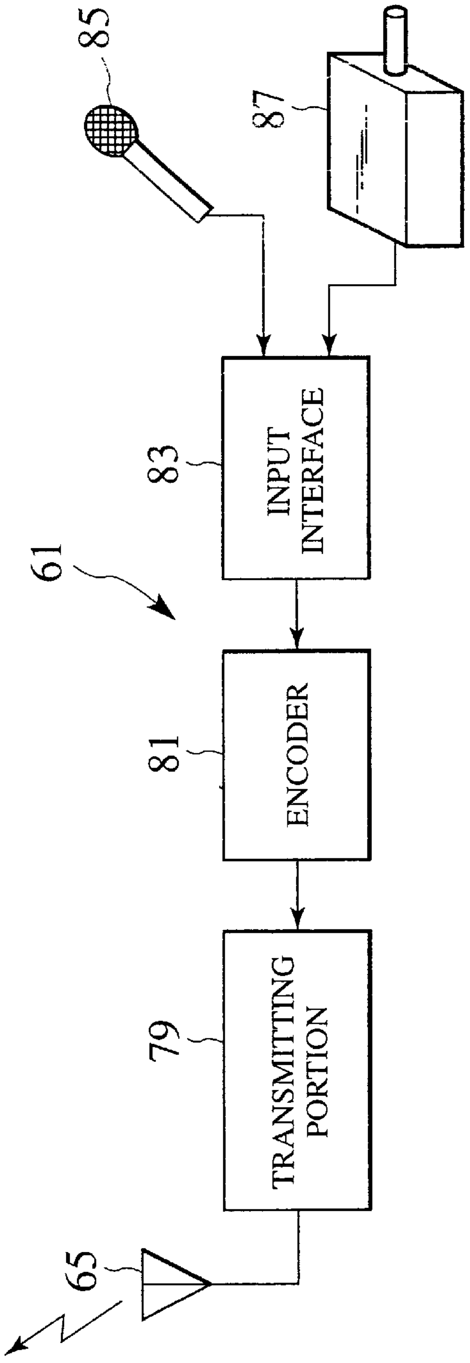
FIGS. 2A, 2B are block structure diagrams of a sound input unit and a sound output unit, respectively.
Figure 2B:
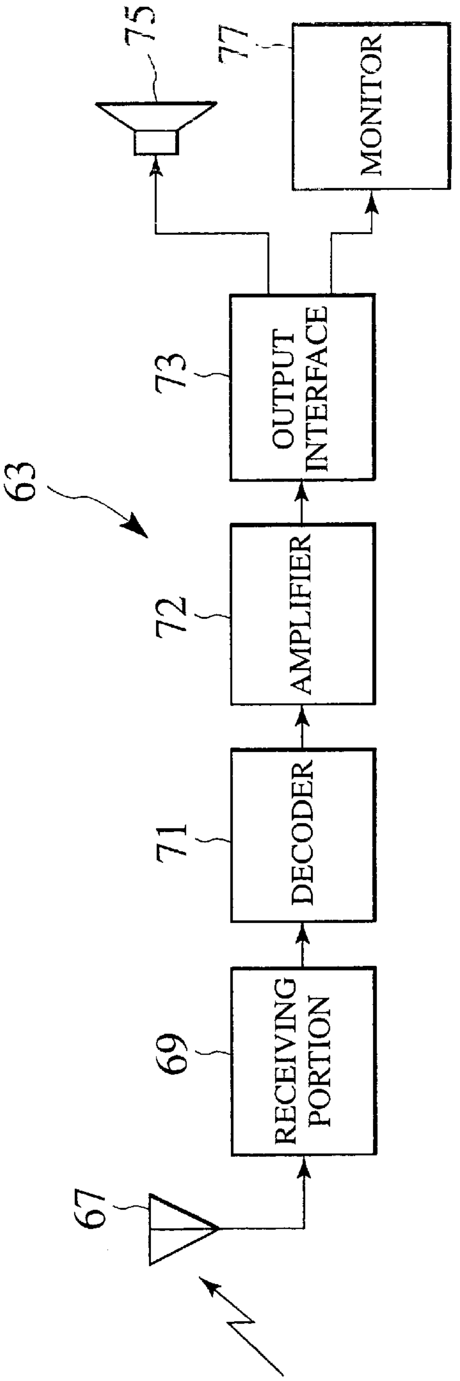

Next, an internal structure of each of the sound input unit 21 and the first to sixth sound output units 14, 31, 37, 43, 49, 55 will be described with reference to FIGS. 2A, 2B. Reference numeral 61 is given to the sound input unit in FIG. 2A and reference numeral 63 is given to the sound output unit in FIG. 2B. Because the internal structures of the first to sixth sound output units are substantially common, a description thereof is carried out by describing the sound output unit 63.

First, the sound input unit 61 comprises an input interface 83 for inputting a sound signal generated in a microphone 85 or various sound generation source 87, an encoder 81 for digitizing the inputted sound signal, a sending portion 79 which acts as a sending means for modulating the digitized sound signal and sending the signal through a radio transmission medium and a sending antenna 65. On the other hand, the sound output unit 63 comprises a reception antenna 67 and receiving portion 69 which act as receiving means for receiving a sound signal sent through a radio transmission medium and demodulating the received sound signal, a decoder 71 for decoding the demodulated sound signal, an amplifier 72 such as auto gain control (AGC) for amplifying a restored sound signal by the decoding at a set amplification factor, an output interface 73 for outputting the amplified sound signal, a speaker 75 and a monitor unit 77.

Then, an operation of the acoustic system 11 having such a structure will be described. In the sound input unit 61, a sound signal generated in the sound generation sources 85, 87 is inputted through the input interface 83. Then, the encoder 81 digitizes the inputted sound signal and the sending portion 79 modulates the digitized sound signal and sends the signal through the sending antenna 65 and radio transmitting medium. On the other hand, in, at least one sound output unit, the receiving portion 69 receives a sound signal sent through the reception antenna 67 and radio transmitting medium and then, demodulates the received sound signal. Then, the decoder 71 decodes the demodulated sound signal. Then, the amplifier 72 amplifies a sound signal restored by the decoding at a set amplification factor and the output interface 73 outputs the amplified sound signal. By receiving the sound signal outputted from the output interface 73, an acoustic unit such as the speaker 75 outputs a sound. The reason why an operation for mainly transmitting and receiving the sound signal is described above is that radio transmission of image data has been disclosed in for example, Japanese Patent Application Laid-Open No. H8-106580 or Japanese Patent Application Laid-Open No. H11-24678 and that the present invention is on a premise of handling mainly sound as a transmission object.

If a sound space to which the acoustic system 11 of the present invention is applied is imagined, for example, home, vehicle compartment, move theater, stage, concert hall and the like can be exemplified. If the acoustic system of the present invention is applied to a relatively wide sound space and multiple sound output units are employed, a difference of time in arrival of sound signal between the respective sound output units becomes as large as cannot be neglected, so that there may be generated such an event that makes listeners feel a sense of disharmony.

Thus, according to the present invention, if multiple sound output units exist and a difference of time occurs between the multiple sound output units, this difference of time is corrected. As a result, even if the difference of time between the respective sound output units becomes so large as not to be able to be neglected, it is possible to avoid such an event that makes listeners feel a sense of disharmony.

Although the countermeasure for a difference of time generated between the multiple sound output units has been described above, various approaches for this correction of the difference of time can be considered.

As an example of such various approaches, information transmitted between the input and output units can be so constructed that it contains a block synchronous signal and a left/right synchronous signal and the correction of the difference of time is carried out based on the aforementioned synchronous signals.

Figure 3:
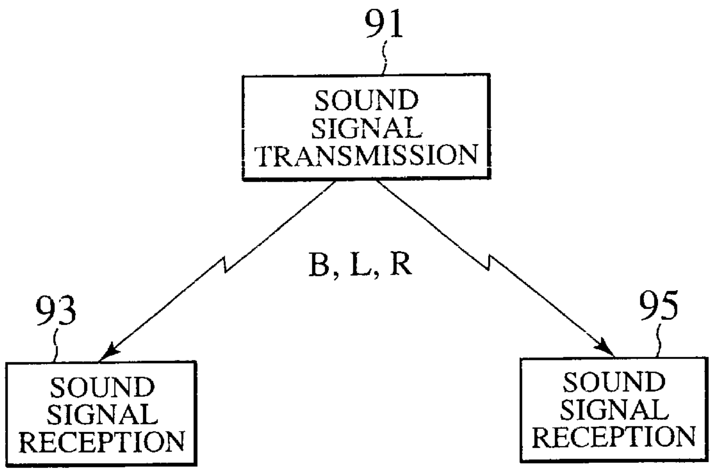
FIG. 3 is a diagram for explaining a countermeasure for a difference of time.

That is, in FIG. 3, the block synchronous signal B and left/right synchronous signal for the digital sound signal are sent from the sound input unit 91 to the sound output units 93, 95. The sound output units 93, 95 output sound signals synchronously with both the synchronous signals so as to prevent occurrences of time delay and a difference of phase.

Figure 4:
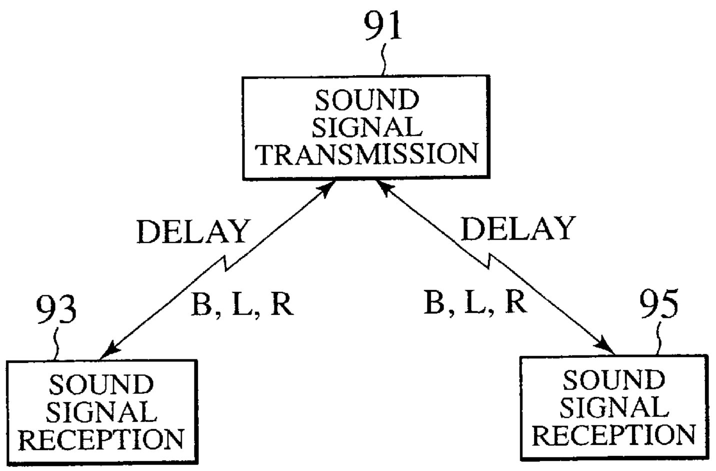
FIG. 4 is a diagram for explaining a countermeasure for a difference of time.

In FIG. 4, the block synchronous signal B and left/right synchronous signal for the digital sound signal are sent from the sound input unit 91 to the sound output units 93, 95. The sound input unit 91 detects a time delay of each of the sound output units 93, 95 with respect to a reference value and sends the detected time delay to the sound output units 93, 95 again so as to correct the time delay in the sound output units 93, 95.

According to the above described embodiment, the correction of the difference of time is carried out based on both the block synchronous signal and left/right synchronous signal. Therefore, each of the multiple sound output units can cancel a difference of time and a difference of phase by only outputting sound synchronously with both the synchronous signals. Consequently, the difference of time can be corrected with such a simple method.

Further, as an example of various approaches, it can be so constructed that the correction of the difference of time is carried out based on a measured difference of time of the sound signal between the multiple sound output units.

Figure 5:
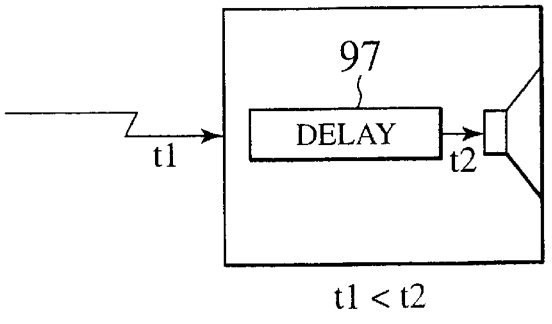
FIG. 5 is a diagram for explaining a countermeasure for a difference of time.

That is, in FIG. 5, a difference of time (t2−t1) until a sound is produced after a sound signal is received is measured for each sound output unit or a difference of time with respect to a reference is measured on the side of the sound input unit by sending a predetermined value set depending on the difference of time to the sound input unit. Then, this difference of time is sent to each sound output unit and corrected by the delay portion 97 provided on each sound output unit. Consequently, the correction of the difference of time is carried out based on a difference of time actually measured between the multiple sound output units, thereby achieving a highly accurate correction of the difference of time.

Meanwhile, the above described embodiment is only an example for facilitating understanding of the present invention and it does not restrict the technical scope of the present invention.

Therefore, naturally the present invention includes all embodiments belonging to that technical scope and further every equivalent.

That is, as an example of application of the acoustic system of the present invention, a headphone comprised of right and left speakers can be formed completely by wireless so as to release a person from discomfort or a feeling of pressure caused because a wire stretched between the right and left speakers makes contact with his body and further, a new application of such a wireless headphone can be expected.

Further, it is needless to say that a power line of each of the input/output units can be made unnecessary if each unit is provided with, for example, solar battery, dry cell, nickel-cadmium battery, lithium-ion battery, nickel metal hydride battery or the like. In this way, the acoustic system of the present invention can be formed completely by wireless.

It should be understood that many modifications and adaptations of the invention will become apparent to those skilled in the art and it is intended to encompass such obvious modifications and changes in the scope of the claims appended hereto.

What is claimed is:

1. An acoustic system comprising:

a sound input unit for inputting a sound signal generated in a sound generating source; and at least one output unit for outputting sound based on said sound signal, wherein radio transmitting medium transmits information containing said sound signal between said sound input unit and said at least one sound output unit wherein if a multiplicity of sound output units exist and a difference of time of sound signals is generated between the multiple sound output units, said difference of time is corrected, and wherein the information comprises a block synchronous signal and a left/right synchronous signal and the difference of time is corrected based on the block synchronous signal and the left/right synchronous signal.

2. The acoustic system of claim 1, wherein at least a portion of said information is transmitted bidirectionally between said sound input unit and said at least one sound output unit.

3. The acoustic system of claim 1, wherein said sound input unit comprises:

an input interface for inputting a sound signal generated in said sound generating source;

an encoder for digitizing the inputted sound signal; and a transmitting means for modulating the digitized sound signal and sending through the radio transmitting medium; and each sound output unit comprises:

a receiving means for receiving a sound signal sent through said radio transmitting medium and demodulating the received sound signal;

a decoder for decoding the demodulated sound signal; and an output interface for outputting a sound signal restored by the decoding.

4. The acoustic system of claim 1, wherein each of said sound input unit and said at least one sound output unit is provided with an address for identifying each of said sound input unit and said at least one sound output unit.

5. The acoustic system according of claim 1, wherein each sound output unit actively changes a sound output function according to a command instruction sent from said sound input unit.

* * * * *

UNITED STATES PATENT AND TRADEMARK OFFICE

CERTIFICATE OF CORRECTION

PATENT NO. : 6,741,708 B1 
DATED : May 25, 2004
INVENTOR(S) : Yoshinori Nakatsugawa It is certified that error appears in the above-identified patent and that said Letters Patent is hereby corrected as shown below:

Column 10,
Line 31, delete "according" after -- system --.

Signed and Sealed this

Fifth Day of October, 2004

JON W. DUDAS
*Director of the United States Patent and Trademark Office*